(12) United States Patent
Rau et al.

(10) Patent No.: US 10,067,540 B2
(45) Date of Patent: Sep. 4, 2018

(54) FRONT MODULE AND DESKTOP COMPUTER SYSTEM

(71) Applicant: Fujitsu Technology Solutions Intellectual Property GmbH, München (DE)

(72) Inventors: Stefan Rau, München (DE); Lutz Rösler, München (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 15/598,395

(22) Filed: May 18, 2017

(65) Prior Publication Data

US 2017/0336837 A1 Nov. 23, 2017

(30) Foreign Application Priority Data

May 20, 2016 (DE) .................. 10 2016 109 357

(51) Int. Cl.
*G06F 1/18* (2006.01)
(52) U.S. Cl.
CPC .................... *G06F 1/181* (2013.01)
(58) Field of Classification Search
None
See application file for complete search history.

(56) References Cited

U.S. PATENT DOCUMENTS

| | | | | |
|---|---|---|---|---|
| 7,649,751 B2* | 1/2010 | Nguyen | ................... | H05K 1/02 361/752 |
| 8,199,523 B2* | 6/2012 | Castiel | .................. | G06F 13/409 361/679.6 |
| 2002/0094706 A1* | 7/2002 | Britton | ............... | H01R 12/7082 439/74 |
| 2008/0183933 A1* | 7/2008 | Peng | ....................... | G06F 1/181 710/302 |

FOREIGN PATENT DOCUMENTS

DE    10 2010 043 195 A1    5/2012
DE    10 2014 115 678 A1    4/2016

* cited by examiner

*Primary Examiner* — Xanthia C Cunningham
(74) *Attorney, Agent, or Firm* — DLA Piper LLP (US)

(57) ABSTRACT

A front module for a desktop computer system includes an interface unit, and a circuit board having a plug, wherein the plug is configured to connect the front module to a mainboard such that there is an electric contact between the mainboard and the interface unit, and the circuit board is dimensioned such that the interface unit terminates with a front chassis side of a casing surrounding the circuit board if the plug is plugged into a socket of a mainboard.

12 Claims, 2 Drawing Sheets

FRONT MODULE AND DESKTOP COMPUTER SYSTEM

TECHNICAL FIELD

This disclosure relates to a front module for a desktop computer system and a desktop computer system

BACKGROUND

Desktop computer systems are very often used, not only privately at home, but also in the professional sector, e.g., in companies. Desktop computer systems comprise a casing, on which a front module is arranged, via which a user can turn on the computer system or to which he or she can connect external peripheral devices such as a USB stick, headphones or memory cards, for example.

The interfaces used in such a front module can transmit data very fast and also output possibly very high power. A C-type 3.1 USB interface, via which up to 100 W can be output, can be used in such a front module, for example. Front modules connect to the mainboard of the computer system typically via cables. Cables are used to supply energy to individual LEDs or contact the power button, for example. Mostly, interfaces connect separately to the mainboard via interface cables. Such a solution is expensive and requires an elaborate mounting process.

It could therefore be helpful to provide a front module and a desktop computer system having a front module that provide an advantageous contacting of the front module with a mainboard of a desktop computer system.

SUMMARY

We provide a front module for a desktop computer system including an interface unit, and a circuit board having a plug, wherein the plug is configured to connect the front module to a mainboard such that there is an electric contact between the mainboard and the interface unit, and the circuit board is dimensioned such that the interface unit terminates with a front chassis side of a casing surrounding the circuit board if the plug is plugged into a socket of a mainboard.

We also provide a desktop computer system including a mainboard having a socket, the front module for a desktop computer system including an interface unit, and a circuit board having a plug, wherein the plug is configured to connect the front module to a mainboard such that there is an electric contact between the mainboard and the interface unit, and the circuit board is dimensioned such that the interface unit terminates with a front chassis side of a casing surrounding the circuit board if the plug is plugged into a socket of a mainboard, wherein the plug is arranged in the socket of the mainboard, and a casing having a front side and rear side located opposite the front side, wherein the mainboard is arranged in the casing such that ports of the mainboard are arranged on the rear side of the casing to be accessible from outside the casing, and the interface port of the front module is arranged on the front side of the casing and terminates with the front chassis side of the casing.

LIST OF REFERENCE NUMERALS

Figure 1A:
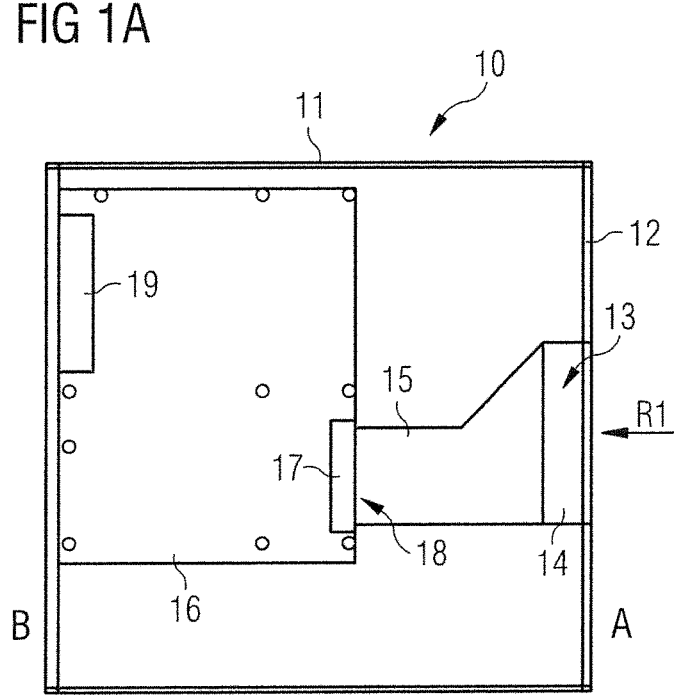
FIG. 1A is a schematic illustration of one example.

10 Desktop computer system
11 Casing
12 Front chassis side
13 Front module
14 Interface unit
15 Circuit board
16 Mainboard
17 Socket
18 Plug
19 Ports
A Front side
B Rear side
C Casing side
R1, R2 Insertion direction

DETAILED DESCRIPTION

We provide a front module for a desktop computer system. The front module comprises an interface unit and a circuit board having a plug. The plug is configured to connect the front module with a mainboard such that there is an electric contact between the mainboard and the interface unit. The circuit board is dimensioned such that the interface unit terminates with a front chassis side of a casing surrounding the circuit board when the plug is plugged into a socket of a mainboard.

The circuit board of the front module is configured to have a length so that it can reach from the front side of the casing all the way to a plug on a mainboard of the computer system. This allows plugging the circuit board with the plug into a socket of the mainboard. In this way, the interface unit on the circuit board of the front module can connect to the mainboard without cables. A connection without cables via the circuit board enables fast transmission of data and provision of high power without cables. This not only simplifies contacting the elements arranged in the interface unit, but it also simplifies a mounting process of the front module. One advantage of this solution is that expensive cables can be dispensed with. Furthermore, mounting effort is reduced.

The interface unit may comprise a power button for a computer system and/or at least one interface port and/or at least one indicator means.

Advantageously, the interface port can be selected from the following standards: USB, PCIe and jack plug. The indicator means may include an LED.

The interface unit may include a power button, one or multiple interface ports of one or multiple standards, and indicator elements. Interface ports of the USB and PCIe standard in the latest versions can not only transmit data in a particularly fast manner, but also provide high power. If high power is to be provided at a C-type USB 3.1 interface output, for example, conventionally, this power is to be conducted through a cable and, if appropriate, a line to the USB socket. Cables capable of outputting high power are relatively expensive. Expensive cables, in particular for interface ports, can be omitted thanks to the circuit board of the type described above.

We also provide a desktop computer system having a mainboard having a socket and a front module of the type explained above. In this case, the plug is arranged in the socket of the mainboard. Furthermore, the desktop computer system comprises a casing having a front side and a rear side located opposite the front side. The mainboard is arranged in the casing such that ports of the mainboard are arranged on the rear side of the casing to be accessible from the outside. The interface port of the front module is arranged on the front side of the casing and terminates with the front chassis side of the casing.

The mainboard comprises a socket into which the circuit board of the front module can be plugged. As a result, the front module can not only be mechanically held in place by being plugged into the socket of the mainboard, but it can also electrically connect to the mainboard.

Advantageously, the circuit board may be arranged in parallel to an extension plane of the mainboard.

The socket on the mainboard can be oriented such that the circuit board can be inserted from the front of the desktop computer system, i.e., from the front chassis side of the casing, and engages in the socket of the mainboard. Incidentally, the circuit board is located parallel to an extension plane of the mainboard.

Alternatively, the circuit board may be arranged perpendicularly to an extension plane of the mainboard.

The socket on the mainboard can be arranged such that an insertion direction runs perpendicularly to an extension plane of the mainboard. In this case, the front module can be inserted in the casing from a casing side, and is placed perpendicularly in relation the mainboard.

Our modules and computer systems will hereinafter be explained in greater detail by figures and examples.

Components having the same functions are indicated with the same reference numerals throughout the figures. However, this shall not be understood as a limitation.

Figure 1B:
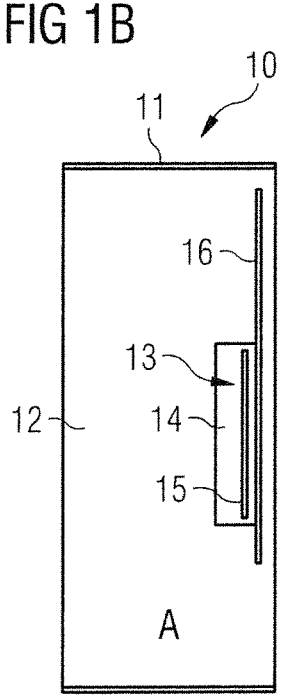
FIG. 1B is a different view of the example of FIG. 1A.
Figure 1C:
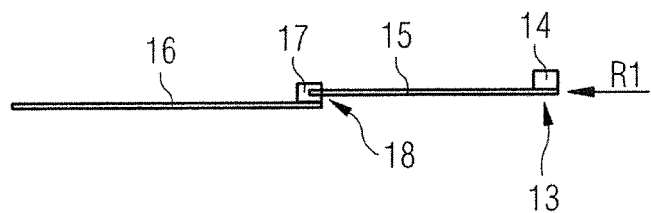
FIG. 1C is another schematic illustration of the circuit boards according to the example of FIG. 1A.

FIGS. 1A, 1B and 1C schematically illustrate a first example. FIG. 1A shows a schematic side view of a desktop computer system 10. FIG. 1B shows a schematic front view of the desktop computer system 10. FIG. 1C shows a schematic illustration of a circuit board connection.

The desktop computer system 10 comprises a casing 11. The casing 11 has a front chassis side 12. The desktop computer system 10 further comprises a mainboard 16 having a socket 17.

The mainboard 16 comprises ports 19. The desktop computer system 10 has a front front side A and a rear rear side B. The front side A is arranged opposite the rear side B.

The mainboard 16 is arranged in the casing 12 such that the ports 19 of the mainboard 16 are arranged on the rear side B such that the ports 19 are accessible from outside the casing.

For example, the ports 19 include USB interface ports, VGA ports, a LAN socket or headphone ports. The rear side B has an opening in the region of the ports, through which the ports 19 are accessible.

The socket 17 is arranged on the mainboard 16 on a side located opposite the ports 19, which side faces in the direction of the front side A. In the example shown in FIGS. 1A to 1C, the socket is arranged such that a socket opening, into which a plug can be plugged, faces in the direction of the front side A.

A front module 13 is arranged on the front chassis side 12. The front module 13 comprises an interface unit 14 and a circuit board 15. The circuit board 15 is configured such that one end of the circuit board 15 ends in a plug 18 plugged in the socket 17. The side of the circuit board 15 opposite the plug 18 comprises an interface unit 14 in this example.

When the front module 13 is plugged into the socket 17 by the plug 18, as illustrated in FIGS. 1A to 1C, the interface unit 14 rests against the front side A, namely the front chassis side 12 of the casing 11 enclosing the circuit board 15 and the mainboard 16.

To mount the front module 13 into the desktop computer system 10, the circuit board 15 can be inserted in the desktop computer system 10 in the insertion direction R1 by the front chassis side 12 on the front side A of the desktop computer system 10. A face plate can be arranged at the front side A, the plate covering the front chassis side 12. The interface unit 14 may comprise a stop (not shown in the figures) or a mounting bracket, by which the front module 13 can be secured to the front chassis side 12 of the desktop computer system 10.

In this example, the opening of the socket 17 faces in a direction parallel to an extension plane of the mainboard 16. Accordingly, the circuit board 15 is inserted into the socket 17 in parallel to the extension plane of the mainboard 16. Thus, the front module 13 is parallel to an extension plane of the mainboard 16.

Figure 2A:
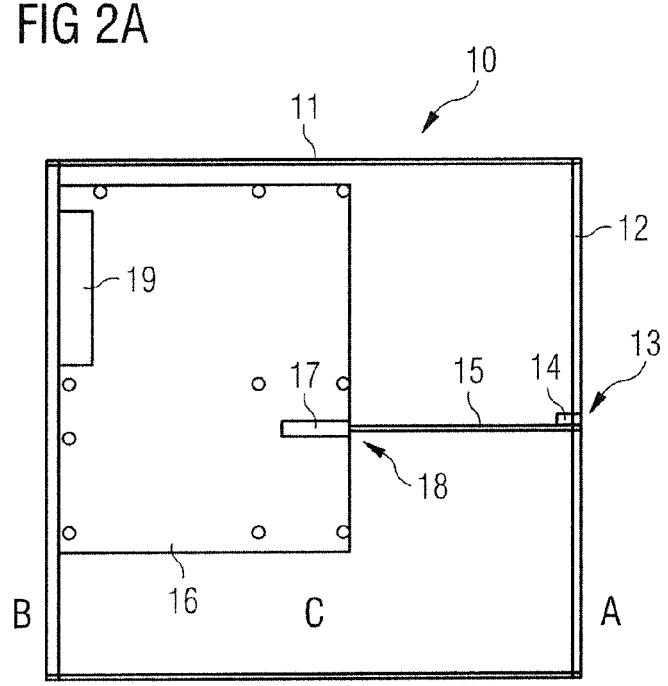
FIG. 2A is a schematic illustration of a further example.
Figure 2B:
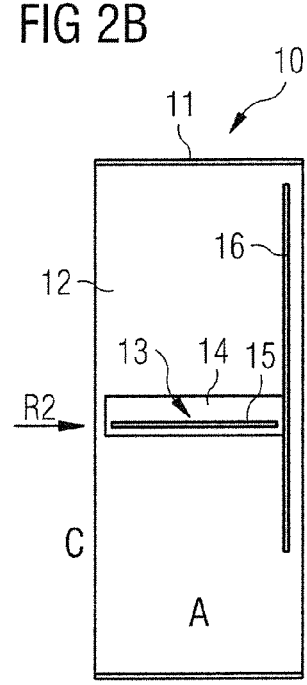
FIG. 2B is a different view of the example of FIG. 2A.
Figure 2C:
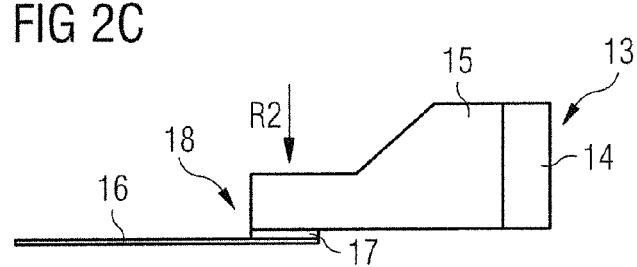
FIG. 2C is another schematic illustration of the circuit boards according to the example of FIG. 2A.

FIGS. 2A, 2B and 2C show another example, in which the socket 17 is arranged on the mainboard 16 such that an opening of the socket 17 to plug in the plug 18 faces a side wall C of the desktop computer system 10. Thus, the opening 10 of the socket 17 faces perpendicularly out of an extension plane of the mainboard 16. In the example shown in FIGS. 2A to 2C, the circuit board 15 has been inserted into the socket 17 from an insertion direction R2 via the casing side C of the desktop computer system 10. In this configuration, the front module 13 is arranged perpendicularly to an extension plane of the mainboard 16.

According to both examples, the interface unit 14 connects to the mainboard 16 without additional cables. This enables an electric or electronic contacting of interface ports (such as an USB socket or a card reader) and other interfaces (such as a power button or a status indicator, e.g., an LED) via conductor tracks in the circuit board 15. Use of cables to contact the interface unit 14 is not required.

The interface unit 14 may include a power button for the desktop computer system 10. Furthermore, the interface unit may include an LED as indicator means to indicate operation of the desktop computer system 10. Furthermore, the interface unit 14 may comprise multiple USB interface ports that can be configured as C-type USB 3.1 interfaces and can transmit high power and high signal rates. The front module 13 may further comprise a PCIe port to connect a card reader of the front module 13 to the mainboard 16, for example. The interface unit 14 may further comprise two jack plug ports to connect headphones or a microphone, e.g., for a headset, with the desktop computer system 10 at the casing front A via the front module 13.

The invention claimed is:

1. A front module for a desktop computer system comprising:
    an interface unit, and
    a circuit board having a plug,
        wherein the plug is configured to connect the front module to a mainboard such that there is an electric contact between the mainboard and the interface unit,
        the circuit board is dimensioned such that the interface unit terminates with a front chassis side of a casing surrounding the circuit board if the plug is plugged into a socket of a mainboard, and
        the circuit board is configured with a length reaching from the front chassis side of the casing to the socket of the mainboard to allow the plug to be plugged into the socket of the mainboard to connect the interface unit of the front module to the mainboard without cables.

2. The front module according to claim 1, wherein the interface unit includes a power button for a computer system and/or in each case at least one interface port and/or at least one indicator means.

3. The front module according to claim 2, wherein the at least one interface port is selectable from standards: USB, PCIe and jack plug.

4. The front module according to claim 2, wherein the indicator means includes an LED.

5. A desktop computer system comprising:
a mainboard having a socket,
the front module according to claim 1, wherein the plug is arranged in the socket of the mainboard, and
a casing having a front side and rear side located opposite the front side,
wherein the mainboard is arranged in the casing such that ports of the mainboard are arranged on the rear side of the casing to be accessible from outside the casing, and
the interface port of the front module is arranged on the front side of the casing and terminates with the front chassis side of the casing.

6. The desktop computer system according to claim 5, wherein the circuit board is arranged parallel to an extension plane of the mainboard.

7. The desktop computer system according to claim 5, wherein the circuit board is arranged perpendicular to an extension plane of the mainboard.

8. The front module according to claim 3, wherein the indicator means includes an LED.

9. A desktop computer system comprising:
a mainboard having a socket,
the front module according to claim 2, wherein the plug is arranged in the socket of the mainboard, and
a casing having a front side and rear side located opposite the front side,
wherein the mainboard is arranged in the casing such that ports of the mainboard are arranged on the rear side of the casing to be accessible from outside the casing, and
the interface port of the front module is arranged on the front side of the casing and terminates with the front chassis side of the casing.

10. A desktop computer system comprising:
a mainboard having a socket,
the front module according to claim 3, wherein the plug is arranged in the socket of the mainboard, and
a casing having a front side and rear side located opposite the front side,
wherein the mainboard is arranged in the casing such that ports of the mainboard are arranged on the rear side of the casing to be accessible from outside the casing, and
the interface port of the front module is arranged on the front side of the casing and terminates with the front chassis side of the casing.

11. A desktop computer system comprising:
a mainboard having a socket,
the front module according to claim 4, wherein the plug is arranged in the socket of the mainboard, and
a casing having a front side and rear side located opposite the front side,
wherein the mainboard is arranged in the casing such that ports of the mainboard are arranged on the rear side of the casing to be accessible from outside the casing, and
the interface port of the front module is arranged on the front side of the casing and terminates with the front chassis side of the casing.

12. A front module for a desktop computer system comprising:
an interface unit, and
a circuit board having a plug,
wherein the interface unit includes a power button for the computer system,
the plug is configured to connect the front module to a mainboard such that there is an electric contact between the mainboard and the interface unit,
the circuit board is dimensioned such that the interface unit terminates with a front chassis side of a casing surrounding the circuit board if the plug is plugged into a socket of a mainboard, and
the circuit board is configured with a length reaching from the front chassis side of the casing to the socket of the mainboard if the plug is plugged into the socket of the mainboard such that the interface unit of the front module connects to the mainboard without cables.

* * * * *